J. WATTS.
Churn.
No 81,716.
Patented Sept. 1, 1868.
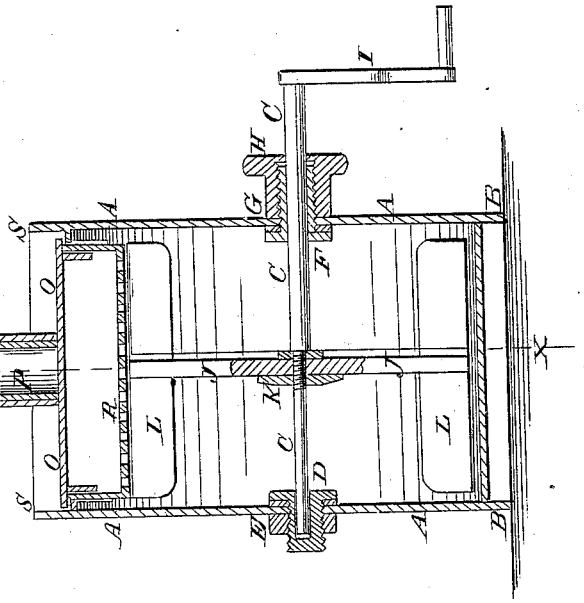
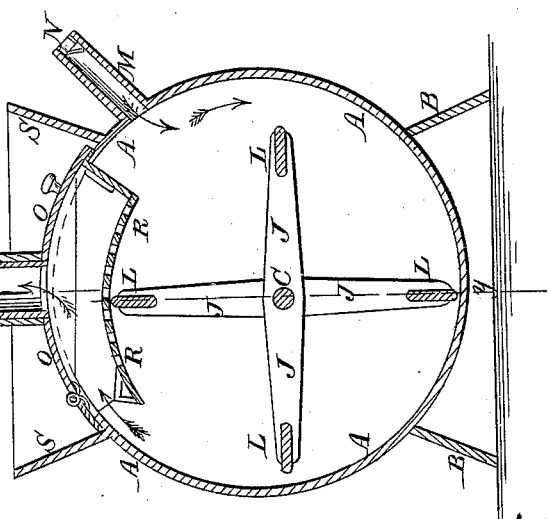
Witnesses:
Wm A Morgan
G. C. Cotton
Inventor.
J Watts
per Munn & Co
Attys

United States Patent Office.

JOSEPH WATTS, OF BRAZIL, INDIANA.

Letters Patent No. 81,716, dated September 1, 1868.

---

IMPROVEMENT IN CHURNS.

---

*The Schedule referred to in these Letters Patent and making part of the same.*

---

TO ALL WHOM IT MAY CONCERN:

Be it known that I, JOSEPH WATTS, of Brazil, in the county of Clay, and State of Indiana, have invented a new and useful Improvement in Churns; and I do hereby declare that the following is a full, clear, and exact description thereof, which will enable others skilled in the art to make and use the same, reference being had to the accompanying drawings, forming part of this specification, in which—

Figure 1 is a vertical cross-section of my improved churn taken through the line $x\,x$ of fig. 2.

Figure 2 is a vertical longitudinal section of the same taken through the line $y\,y$, fig. 1.

Similar letters of reference indicate corresponding parts.

My invention has for its object to furnish an improved churn, which shall be simple in construction, easily operated, effective in operation, bringing the butter quickly, developing all the butter that may be in the milk, and separating the butter as fast as it is formed from the milk.

It consists in the construction and combination of the various parts of the churn, as hereinafter more fully described.

A is the body of the churn, which is made cylindrical in form, and may be made of any desired size or capacity, and is supported upon legs, B, of such a length as to raise the churn to a convenient height.

C is the dasher-shaft, which passes longitudinally and horizontally through the body, A, of the churn, a little to one side of its centre, as shown in fig. 1.

The forward end of the shaft C rests in a socket, D, secured to the end of the churn A by the nut E, and packed so as to be water-tight. The other end of the shaft C passes through the other end of the body, A, of the churn, through a water-tight stuffing-box, F, which is secured in place by the nut G and binding-nut H. To the outer end of the shaft C is attached the crank, I, by which the churn is operated.

J are the arms of the dasher, through the centres of which are formed holes, having screw-threads cut in them, fitting upon the screw-thread cut upon the middle part of the shaft C. The arms J are secured in place, and in their proper relative positions, by the nut K, as shown in fig. 2. To the outer ends of the radial arms J are attached the paddles or floats L, which are made broad, and of such a length as to extend nearly from end to end of the churn, as shown in fig. 2.

M is a pipe, leading in through the upper part of the body, A, of the churn, upon that side upon which the paddles L move downwards. The pipe M has a valve, N, formed in it, opening inward, as shown in fig. 1, which allows the air to enter freely through the pipe M, but prevents its escape through said pipe.

Through the top of the body A of the churn is formed a large opening, into which fits the case or frame of the hinged lid O, to the centre of which is attached an open pipe, P, through which the air escapes freely from the churn.

R is a screen, suspended from the case or frame of the hinged lid O, and which is curved, to correspond with the sweep of the paddles L, as shown in figs. 1 and 2. The screen R is made close at the sides and one end, but the other end, towards which the paddles L move, is open, as shown in fig. 1.

By this construction, as the paddle L moves down into and through the milk, the tendency is to form a vacuum, to fill which the air rushes in through the valved pipe M, and is carried down by and with the said paddles L into the cream, and greatly assists in bringing the butter. The air thus introduced rises through the cream, and escapes through the pipe P. As the butter is formed, it is thrown by the paddle L upon the screen R, where it remains, the milk draining off, and running back into the body of the churn, so that when the churning is finished all the butter will be found upon the said screen, from which it may be removed by raising the hinged lid O, or the lid-case and screen may be detached from the churn before removing the butter, if desired.

S is a guard-plate or flange, attached to the body, A, of the churn, about the opening in the top of said churn, to prevent the escape of any milk that may find its way out around the lid.

Having thus described my invention, I claim as new, and desire to secure by Letters Patent—

1. The suspended screen R and hinged lid O, in combination with the body, A, of the churn, and with the revolving paddles L, substantially as herein shown and described, and for the purpose set forth.

2. The combination of the crank-shaft C, arms J, and paddles L, with each other, and with the body A and screen R of the churn, said parts being constructed and arranged substantially as herein shown and described, and for the purpose set forth.

JOSEPH WATTS.

Witnesses:
SAMUEL GOUTER,
J. M. HALLERT.